United States Patent [19]

Stratmann et al.

[11] Patent Number: 4,730,420
[45] Date of Patent: Mar. 15, 1988

[54] DRILLING DEVICE FOR DRILLING PLATES SUSCEPTIBLE TO BREAKING

[75] Inventors: Herbert Stratmann, Bochum; Joachim Korswird, Bramsche III; Uwe Werner, Enger, all of Fed. Rep. of Germany

[73] Assignee: Benteler-Werke AG, Paderborn, Fed. Rep. of Germany

[21] Appl. No.: 825,099

[22] Filed: Jan. 31, 1986

[30] Foreign Application Priority Data

Feb. 6, 1985 [DE] Fed. Rep. of Germany ... 8503153[U]

[51] Int. Cl.⁴ ............................................. B24B 1/00
[52] U.S. Cl. .............................. 51/283 R; 51/111 R; 269/87.3; 269/258; 408/37; 408/72 R
[58] Field of Search ............. 51/283 R, 111 R, 241 S; 125/20; 408/36, 37, 97, 115 R, 72 R, 145, 42; 269/257, 258, 259, 261, 263, 264, 271, 279, 280, 283, 281, 284, 87, 87.1, 87.3

[56] References Cited

U.S. PATENT DOCUMENTS 3,813,820  6/1974  Highberg et al. ................. 408/37
4,429,862  2/1984  Niedecker ........................ 269/258

Primary Examiner—Frederick R. Schmidt
Assistant Examiner—Maurina Rachuba
Attorney, Agent, or Firm—Michael J. Striker

[57] ABSTRACT

A drilling machine for drilling holes in glass panes includes an annular support and an annular pressing member aligned opposite each other along a path of movement of the drill bit. The support and the pressing member are swingably mounted relative to the axis of the drill bit and are made preferably as inner rings of a ball and socket joint.

6 Claims, 2 Drawing Figures

DRILLING DEVICE FOR DRILLING PLATES SUSCEPTIBLE TO BREAKING

BACKGROUND OF THE INVENTION

The present invention relates to a drilling device for processing fragile plates, particularly of glass, the device including at least one drill piece, a support for the plate to be drilled and a pressure pad for holding down the processed plate on the support.

Fragile or brittle plates, particularly glass panes have hitherto been drilled on simple or multiple drilling machines that is on machines having a single or several drill bits whereby the plates being drilled have been supported on flat plates, strips, conveying belts or on transportation rollers.

For this purpose, different designs of drilling machines have been used. It is known to held the drilled plates in position on the supporting strips, transporting belts, transporting rollers and the like by means of press pads or similar holding down devices.

The known prior art drilling machines of this kind, irrespective of their construction have the disadvantage that in the range of the support and/or pressing pads the drill bit produced in the brittle plate being drilled such high bending stresses that the fragile plate was prone to rupture.

SUMMARY OF THE INVENTION

It is therefore a general object of the present invention to overcome the disadvantages of prior art drilling machines of this kind.

In particular, it is an object of this invention to provide such an improved drilling machine for processing brittle plates which eliminate the bending stress in the range of the drill bit.

In keeping with this object and others which will become apparent hereafter, one feature of this invention resides in a combination in which one or more drill bits are moved along an axis passing through the support and the pressing pad and the support and the pressing pad being swingably mounted relative to the axis of movement of the drill bit.

By virtue of the swingable construction of the support and of the pressing pad it is insured that the latter components always abut with their whole surface against the plate being drilled irrespective of its condition. Consequently, any bending stresses within the plate are effectively prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTON OF THE DRAWING

FIG. 1 is a schematic side view of an embodiment of a drilling machine for drilling plates susceptible to breaking; and FIG. 2 is a sectional side view of a cut-away part indicated by II in the machine of FIG. 1, shown on an enlarged scale and without drill bits.

DESCRIPTION OF THE PREFERRED EMBODIMENT

Figure 1:
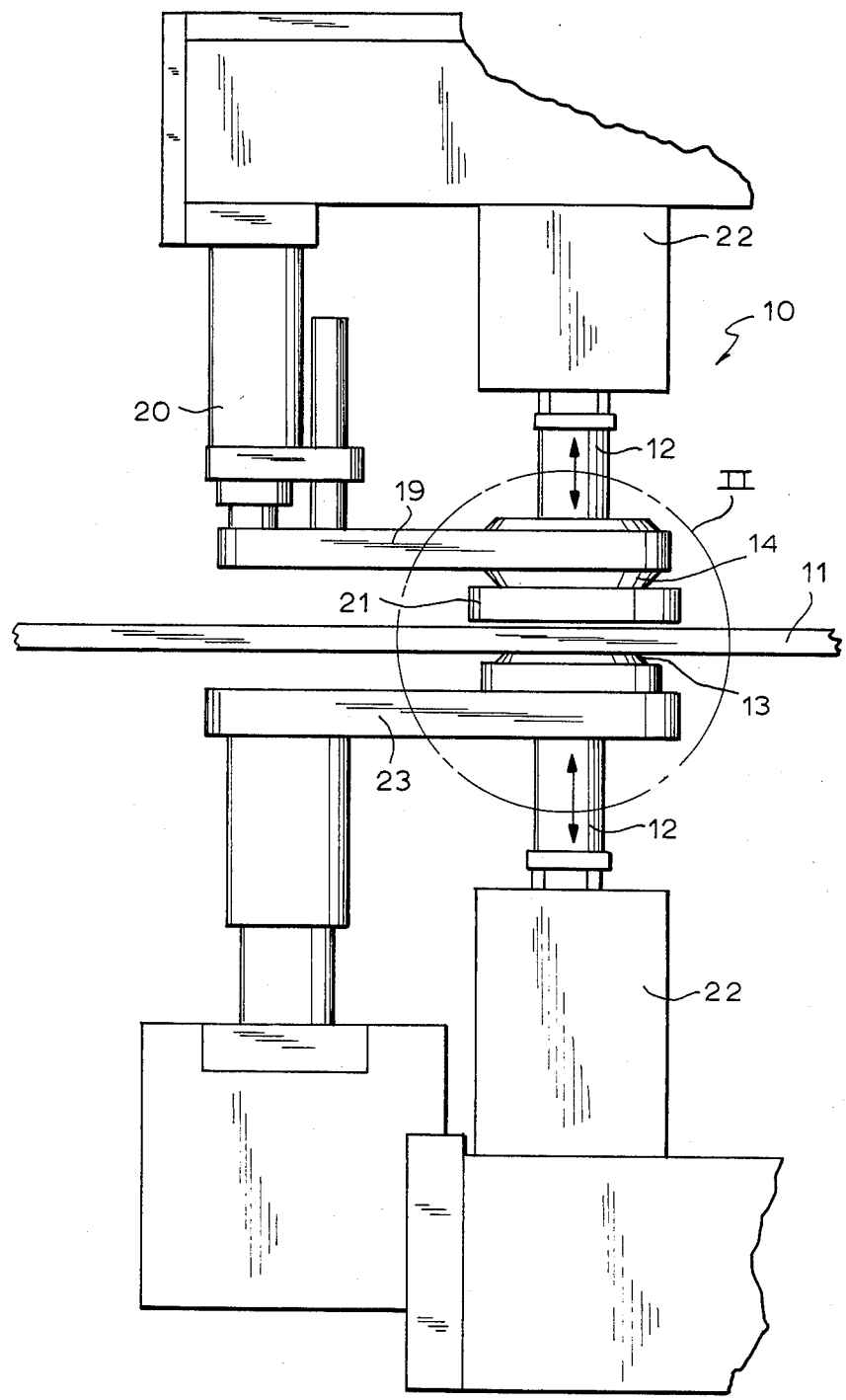

The drilling machine 10 for drilling fragile or brittle plates 11 consists essentially of two drilling heads arranged opposite each other to move in opposite direction along an axis 2 drill bits 12. Plate 11 is supported on an annular support 13 and held in position by an annular pressing member 14 engaging from opposite sides the plate 11.

Figure 2:
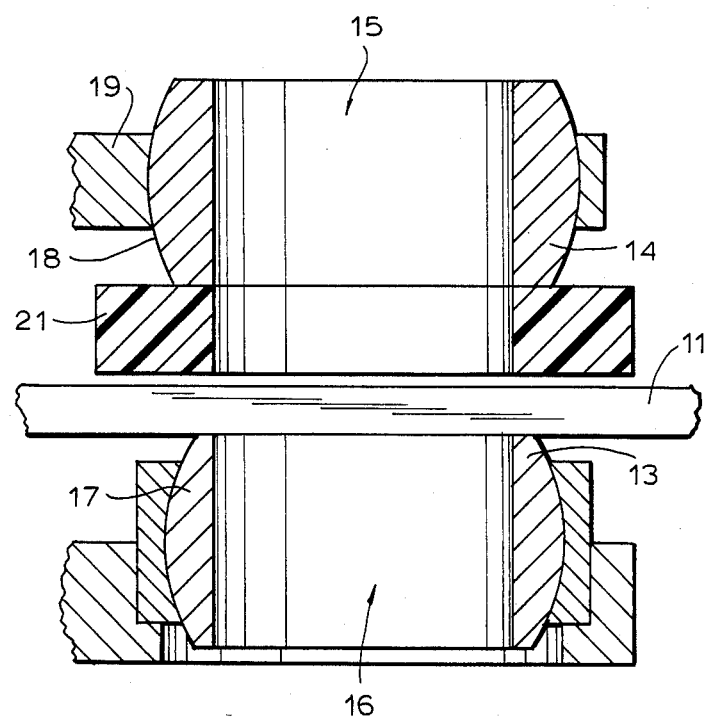

It will be seen from FIGS. 1 and 2, that the support 13 and the pressing member 14 are coaxial with respect to the axis of movement of the drill bits 12. The drilling machine 10 thus operates with two drill bits which are simultaneously moved both from below and from above to pass through openings 15 and 16 of the annular support 13 and annular pressing member 14 and also to simultaneously engage and drill the plate 11.

Both the support 13 and the pressing member 14 are swingably or pivotably mounted relative to the axis of movement of the drill bits 12 in such a manner that irrespective of the condition of the upper surfaces of the drilled plate 11 the whole abutment surface both of the support and of the pressing member contact the upper surfaces of the plate 11. By virtue of this self-adjusting full surface contact any bending strains in the drilling range of the plate 11 are completely eliminated. Consequently the risk that the processed plate 11 of fragile material becomes damaged during drilling is reduced to minimum.

In the illustrated embodiment of FIG. 2, the support 13 is an inner ring of a ball and socket joint 17 which is commercially available and consequently the swingable mount of the support 13 can be accomplished with low cost.

The pressing member 14 in principle can be also in the form of an inner ring of a ball and socket joint. In the preferred embodiment, however, the pressing member 14 is in the form of a plastic ring whose jacket is shaped as a spherical section slidably mounted in a correspondingly shaped socket 18 at the end of a vertically adjustable bracket 19. By bracket 19 whose vertical position is adjustable by a hydraulic cylinder 20, the plastic pressure ring 14 is brought into engagement with the upper surface of the plate 11 and upon completion of the drilling operation the ring 14 is lifted.

In the illustrated embodiment, the swingable pressure ring 14 is provided at its bottom surface with an annular press pad 21 of elastic material so that upon contacting the drilled plate 11 only a minimum pressure is applied against the plate 11 in its drilling range.

In a modification, the supporting ring 13 can be made also of a plastic material with outer jacket in the form of a spherical section. In practice, however, it has been proved that especially in drilling thin glass panes it is of advantage when the support is of a rigid material.

The counteracting drill bits 12 illustrated in FIG. 1, are preferably the so-called hollow drills which during drilling action cut a circular disc from the plate 11. The drill heads for the drills 12 are moved by motors 22 in the directions indicated by double arrow. It is also of advantage when the support 13 is mounted on a vertically adjustable bracket 23 driven by a hydraulic cylinder similarly as the bracket 19.

While the invention has been illustrated and described as embodied in a specific example of a drilling machine for fragile panes, it is not intended to be limited to the details shown, since various modifications and structural changes can be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for drilling plates susceptible to breaking, particularly glass panes, comprising an annular support for a plate to be drilled; an annular pressing member arranged for movement opposite said support to engage and press the plate; a drill piece supported for movement along an axis passing through openings of said support and said pressing member; said support and said pressing member having respectively an outer jacket in the form of a spherical segment slidably mounted in a correspondingly shaped socket to adjust themselves to inclined positions of the plate relative to said axis.

2. A device as defined in claim 1, wherein said support and said pressing member are plastic rings.

3. A device as defined in claim 2, wherein the plastic ring of the pressing member is provided at its bottom with a contact ring of an elastic material.

4. A device as defined in claim 1, wherein the support is swingably mounted on a vertically adjustable device.

5. A device as defined in claim 1, wherein the pressing member is swingably mounted on a vertically adjustable 6. A device for drilling plates susceptible to breaking, particularly glass panes, comprising an annular support for a plate to be drilled; an annular pressing member arranged opposite said support to engage the plate; a drill piece supported for movement along an axis passing through openings of said support and said pressing member; and said support and said pressing member being inner rings of ball and socket joints adjustable to inclined positions of the plate relative to said axis.

* * * * *